(12) United States Patent
Im

(10) Patent No.: US 12,111,075 B2
(45) Date of Patent: Oct. 8, 2024

(54) EASY-TO-CLEAN HEATED HUMIDIFIER

(71) Applicant: Kang Kyung Im, Gyenoggi-do (KR)

(72) Inventor: Kang Kyung Im, Gyenoggi-do (KR)

( * ) Notice: Subject to any disclaimer, the term of this patent is extended or adjusted under 35 U.S.C. 154(b) by 0 days.

(21) Appl. No.: 17/419,823

(22) PCT Filed: Sep. 21, 2020

(86) PCT No.: PCT/KR2020/012676
§ 371 (c)(1),
(2) Date: May 25, 2022

(87) PCT Pub. No.: WO2021/060780
PCT Pub. Date: Apr. 1, 2021

(65) Prior Publication Data
US 2022/0299217 A1    Sep. 22, 2022

(30) Foreign Application Priority Data

Sep. 25, 2019  (KR) .......................... 10-2019-0118210

(51) Int. Cl.
*F24F 6/12*    (2006.01)
*F24F 6/02*    (2006.01)
(Continued)

(52) U.S. Cl.
CPC ................ *F24F 6/12* (2013.01); *F24F 6/025* (2013.01); *F24F 13/20* (2013.01); *F24F 2006/008* (2013.01)

(58) Field of Classification Search
CPC .... F24F 6/12; F24F 6/025; F24F 13/20; F24F 2006/008; F24F 2006/146; Y02B 30/70
See application file for complete search history.

(56) References Cited

U.S. PATENT DOCUMENTS 4,663,091 A * 5/1987 Seo ........................... F24F 6/12
                                                         261/81
6,098,963 A * 8/2000 Dubin ....................... F24F 6/00
                                                   261/DIG. 65
(Continued)

FOREIGN PATENT DOCUMENTS

CN    101280947 A  * 10/2008    .............. F24F 11/30
CN    105928118 A  *  9/2016
(Continued)

OTHER PUBLICATIONS

Epo translation of KR20010065726 (Year: 2001).*
(Continued)

*Primary Examiner* — Stephen Hobson
(74) *Attorney, Agent, or Firm* — Pearne & Gordon LLP

(57) ABSTRACT

An easy-to-clean heated humidifier is proposed. The easy-to-clean heated humidifier is configured to be easily cleaned by separating a water container from the humidifier. The easy-to-clean heated humidifier includes: a lower main body including a heating means, and a dial configured to adjust an amount of humidification; and an upper main body provided at an upper end of the lower main body, including an outer casing, and an inner casing located inside the outer casing, having a partial opening to allow water in the outer casing to flow into the inner casing, and configured to vaporize the water in the inner casing by the heating means.

5 Claims, 6 Drawing Sheets

[A - A]

(51) Int. Cl.
*F24F 13/20* (2006.01)
*F24F 6/00* (2006.01)

(56) References Cited

U.S. PATENT DOCUMENTS

| | | | | |
|---|---|---|---|---|
| 6,244,576 | B1* | 6/2001 | Tsai | F24F 6/02 |
| | | | | 261/DIG. 65 |
| 2006/0118977 | A1* | 6/2006 | Huang | F24F 6/00 |
| | | | | 261/DIG. 65 |
| 2007/0152356 | A1* | 7/2007 | Huang | F24F 6/00 |
| | | | | 261/81 |
| 2007/0176306 | A1* | 8/2007 | Huang | F24F 6/00 |
| | | | | 261/DIG. 65 |
| 2007/0257386 | A1* | 11/2007 | Menassa | F24F 6/18 |
| | | | | 261/DIG. 65 |
| 2008/0054497 | A1* | 3/2008 | Bradley | A61M 16/167 |
| | | | | 261/19 |
| 2012/0154760 | A1* | 6/2012 | Nutter | F24F 6/00 |
| | | | | 353/57 |
| 2015/0054183 | A1* | 2/2015 | Chen | F24F 13/00 |
| | | | | 261/150 |
| 2019/0041084 | A1* | 2/2019 | Atkins, Jr. | F24F 6/14 |
| 2019/0293309 | A1* | 9/2019 | Cai | F24F 6/12 |
| 2019/0301756 | A1* | 10/2019 | Luo | F24F 8/30 |
| 2019/0309967 | A1* | 10/2019 | Seo | F24F 6/00 |
| 2019/0353362 | A1* | 11/2019 | Montagnino | F24F 8/108 |
| 2023/0221018 | A1* | 7/2023 | Kim | F24F 11/00 |

FOREIGN PATENT DOCUMENTS

| | | | | | |
|---|---|---|---|---|---|
| CN | 106969456 | A | * | 7/2017 | B01D 46/10 |
| CN | 107270457 | A | * | 10/2017 | |
| CN | 107388459 | A | * | 11/2017 | F24F 13/00 |
| CN | 107388463 | A | * | 11/2017 | |
| CN | 207881061 | U | * | 9/2018 | |
| CN | 110017559 | A | * | 7/2019 | F24F 13/00 |
| CN | 116007173 | A | * | 4/2023 | |
| JP | 2000-018652 | A | | 1/2000 | |
| JP | 2000346409 | A | * | 12/2000 | F24F 6/025 |
| JP | 2013-534855 | A | | 9/2013 | |
| KR | 10 2001 065726 | A | | 7/2001 | |
| KR | 10 2001 0070690 | A | | 7/2001 | |
| KR | 20010065726 | | * | 7/2001 | |
| KR | 2002028190 | A | * | 4/2002 | C02F 1/461 |
| KR | 2002037016 | A | * | 5/2002 | F24F 6/18 |
| KR | 2005032364 | A | * | 4/2005 | F24F 11/0008 |
| KR | 10 2006 0123050 | B1 | | 12/2006 | |
| KR | 10-1728056 | B1 | | 4/2017 | |
| KR | 1728056 | B1 | * | 4/2017 | F24F 13/20 |
| KR | 10 2017 0105433 | A | | 9/2017 | |
| KR | 2017105433 | A | * | 9/2017 | F24F 11/0008 |
| KR | 2017129307 | A | * | 11/2017 | F24F 6/16 |
| KR | 2019043234 | A | * | 4/2019 | F24F 11/0008 |
| KR | 10 2021 0042302 | A | | 4/2021 | |
| WO | WO-2008082052 | A1 | * | 7/2008 | F24F 6/00 |
| WO | WO-2019111667 | A1 | * | 6/2019 | B05B 17/0615 |
| WO | WO-2021060780 | A1 | * | 4/2021 | F24F 13/20 |

OTHER PUBLICATIONS

International Search Report for corresponding International Application No. PCT/KR2020/012676 mailed Dec. 17, 2020.
International Search Report for corresponding International Application No. PCT/KR2020/012676 dated Dec. 17, 2020.
Notification of Reason for Refusal dated Dec. 1, 2021 for corresponding Korean Application No. 10-2021-0133478 and English translation.

* cited by examiner (a)

(b)

122

[A − A]

EASY-TO-CLEAN HEATED HUMIDIFIER

TECHNICAL FIELD

The present disclosure relates to an easy-to-clean heated humidifier and, more particularly, to an easy-to-clean heated humidifier having a water container that may be separated from the humidifier and easily cleaned.

BACKGROUND ART

In general, a humidifier is a device that increases humidity in a room by generating steam. In winter when humidity is decreased significantly, the humidifier is used to artificially generate steam to create a comfortable indoor environment. Recently, as the use of heaters in homes and offices is sharply increased, the demand for the humidifier is gradually increased.

The humidifier is classified into a heated humidifier and an ultrasonic humidifier according to humidification methods. Specifically, the heated humidifier is operated by a method of naturally spraying steam generated by heating water in a water container to a predetermined temperature, and the ultrasonic humidifier is operated by a method of spraying fine water particles by vibrating water in a water container with ultrasonic waves.

The heated humidifier may kill bacteria contained in water by heating the water, but has a small amount of humidification because the heated humidifier humidifies using vaporized steam. However, the ultrasonic humidifier spraying fine water particles generated by ultrasonic waves has an amount of humidification relatively larger than the amount of humidification of the heated humidifier, but the ultrasonic humidifier without heating process by the heating means cannot sterilize water therein.

In the ultrasonic humidifier, water is supplied to a vibrator constituting the ultrasonic humidifier to spray fine water particles with ultrasonic waves, and the vibrator vibrates the supplied water to generate the fine water particles.

The ultrasonic humidifier spraying the fine water particles by using ultrasonic waves has an environment in which bacteria in the water can easily grow. Therefore, in order to solve the above problem, various ultrasonic humidifiers that can easily clean the water container have been released on the market.

On the other hand, in the case of the heated humidifier that can kill bacteria in water, heated humidifiers that can clean the water container are less common in the market than ultrasonic humidifiers. However, the inside of the water container may be contaminated due to floating matter in the water in the heated humidifier, so the heated humidifier also needs a method for easily cleaning the inside thereof.

DISCLOSURE

Technical Problem

Accordingly, the present disclosure has been made keeping in mind the above problems occurring in the related art, and an objective of the present disclosure is to provide an easy-to-clean heated humidifier having a water container that may be easily cleaned.

Another objective of the present disclosure is to propose a heated humidifier in which the time required for initial spray of steam is reduced.

A further objective of the present disclosure is to provide a heated humidifier in which noise or vibrations transmitted to the outside of the humidifier is reduced.

A further objective of the present disclosure is to provide a heated humidifier whose surface temperature is not high.

Technical Solution

An easy-to-clean heated humidifier of the present disclosure includes: a lower main body including a heating means, and a dial for adjusting an amount of humidification; and an upper main body provided at an upper end of the lower main body, including an outer casing, and an inner casing located inside the outer casing, having a partial opening to allow water in the outer casing into the inner casing, and configured to vaporize the water in the inner casing by the heating mean.

Advantageous Effects

According to the present disclosure, an easy-to-clean heated humidifier has a main body including a preheating casing and a heating casing that may be separated from each other. Accordingly, an outer casing, the preheating casing, and the heating casing constituting the main body can be easily cleaned.

According to the present disclosure, a water container divided into the outer casing, the preheating casing, and the heating casing may heat only water stored in the heating casing located at an innermost portion in the water container by using a heating means so that the time required for initial spray of steam can be reduced. Furthermore, water in the preheating casing is preheated by the water in the heating casing and the preheated water is moved into the heating casing, so that the time required to vaporize the water in the heating casing into steam can be reduced.

In addition, according to the present disclosure, the water container is divided into the outer casing, the preheating casing, and the heating casing. Accordingly, noise and vibrations generated in the water container can be reduced.

In particular, the present disclosure heats only the water in the heating casing by using the heating means, so that the temperature of a surface of the outer casing is relatively lower than the temperature of a surface of the heating casing. Accordingly, injuries to a user caused by the outer casing can be reduced.

MODE FOR INVENTION

Described and further aspects of the present disclosure will be clear through preferred embodiments described with reference to the accompanying drawings. Hereinafter, the present disclosure will be described in detail for those skilled in the art to easily understand and realize through the embodiments.

Figure 1:
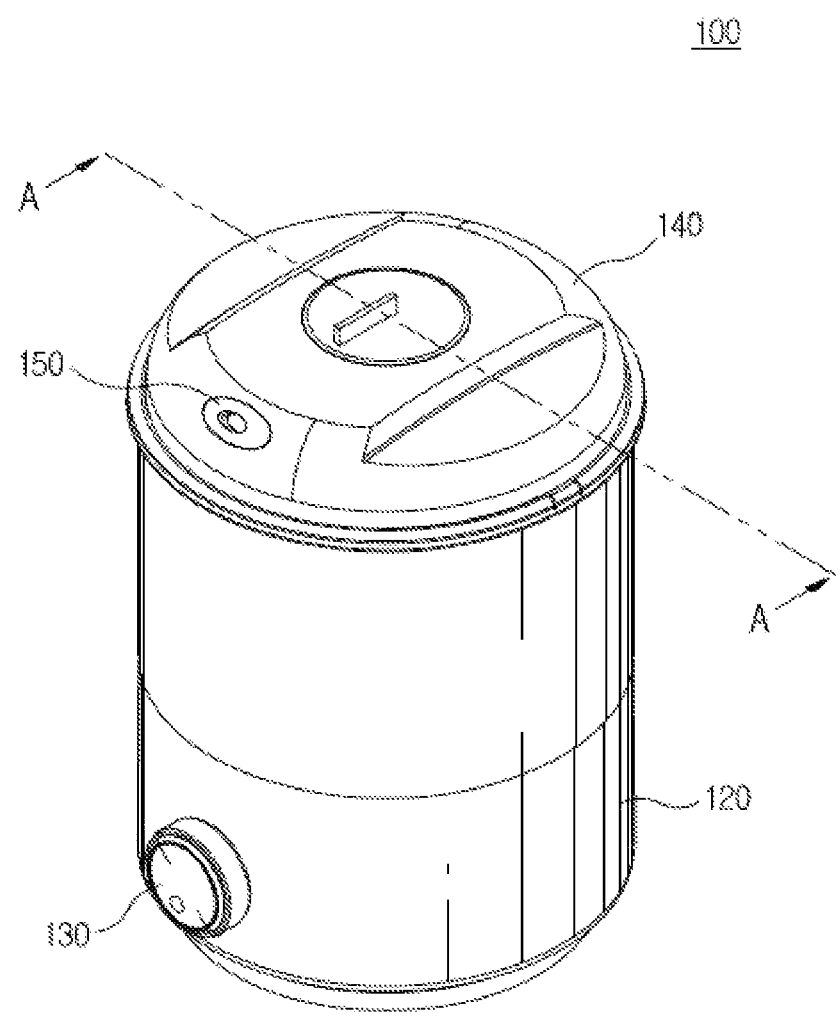
FIG. 1 is a view showing an easy-to-clean heated humidifier according to an embodiment of the present disclosure.

FIG. 1 is a view showing an easy-to-clean heated humidifier according to an embodiment of the present disclosure. Hereinafter, the easy-to-clean heated humidifier according to the embodiment of the present disclosure will be described with reference to FIG. 1.

Referring to FIG. 1, the easy-to-clean heated humidifier 100 includes a main body, an operation means, a cover, and a spraying port. The easy-to-clean heated humidifier 100 proposed by the present disclosure may include other elements in addition to the described elements.

The main body 120 constitutes a main part of the easy-to-clean heated humidifier, and includes a power supply supplied with power from the outside, the operation means 130 adjusting an amount of steam (amount of humidification) sprayed through the spraying port 150. A control means (control board) controlling operation of the easy-to-clean heated humidifier 100 and the heating means (not shown) heating water stored in a water container are arranged inside the main body 120.

The operation means 130 is provided on the main body 120, and adjusts an amount of steam sprayed through the spraying port 150 by using a dial or other manipulators. The drawing of the present disclosure shows that the dial is used to adjust the amount of steam sprayed through the spraying port 150, but the present disclosure is not limited thereto. In detail, a button or other methods excluding the dial may be used to adjust an amount of steam sprayed through the spraying port 150.

The main body 120 includes the water container and heats the water stored in the water container by using the heating means. The water heated by the heating means is changed into steam, and the steam is sprayed to the outside through the spraying port 150. A structure of the water container proposed by the present disclosure will be described below.

The cover 140 is provided on an upper end of the main body 120 and serves to cover the open upper end of the main body 120. The cover 140 serves to prevent transmission of noise generated in the main body 120 to the outside by covering the upper end of the main body 120.

The spraying port 150 is a part through which the steam changed from the water stored in the water container is sprayed to the outside. The spraying port 150 is provided on an upper rim spaced outward from an upper center of the cover 140. The steam is sprayed to the outside through the spraying port 150.

Figure 2:
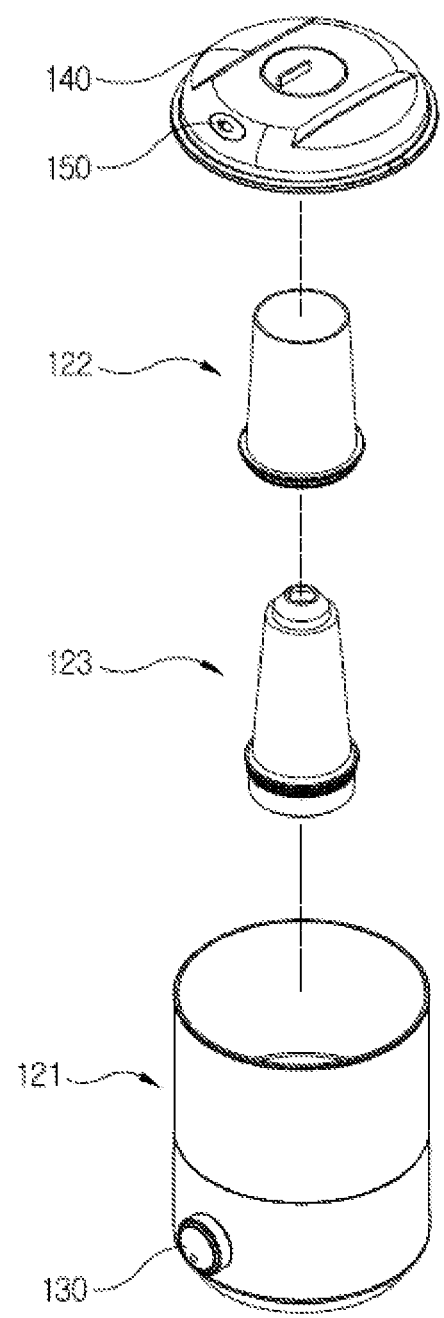
FIG. 2 is an exploded-perspective view showing the easy-to-clean heated humidifier according to the embodiment of the present disclosure.

FIG. 2 is an exploded-perspective view showing the easy-to-clean heated humidifier according to the embodiment of the present disclosure. Hereinafter, an exploded structure of the easy-to-clean heated humidifier according to the embodiment of the present disclosure will be described in detail with reference to FIG. 2.

Referring to FIG. 2, the easy-to-clean heated humidifier includes the cover and the main body, and the main body includes the outer casing, the preheating casing, and the heating casing. The easy-to-clean heated humidifier proposed by the present disclosure may include other elements in addition to the described elements.

The cover 140 includes the spraying port 150 as described above. A steam transport pipe is provided in the cover 140 to supply steam to the spraying port 150.

The main body 120 is located at a lower end of the cover 140, and includes the operation means 130 adjusting an amount of steam sprayed through the spraying port 150 of the cover 140. As described above, the operation means 130 may be applied to the main body as various methods such as a dial or a button.

The main body 120 includes an outer casing 121 and an inner casing, and the inner casing includes a preheating casing 122 and a heating casing 123. The main body 120 may consist of two areas of the outer casing and the heating casing. Hereinafter, for convenience of description, the main body will be described as including the outer casing, the preheating casing, and the heating casing, but the main body may consist of four areas rather than the three areas, if necessary.

The preheating casing 122 is located inside the outer casing 121, and the heating casing 123 is located inside the preheating casing 122. Adding additional descriptions, the main body 120 is configured such that the outer casing 121, the preheating casing 122, and the heating casing 123 are arranged in order from an outer portion of the main body 120. Shapes and structures of the outer casing 121, the preheating casing 122, and the heating casing 123 will be described later.

In the easy-to-clean heated humidifier proposed by the present disclosure, the preheating casing and the heating casing constituting the main body may be separated from the main body. A user can remove the preheating casing and the heating casing from the outer casing that is a portion storing water and simply perform cleaning. In detail, the user can separate the preheating casing and the heating casing from the main body for cleaning, and can easily clean the preheating casing and the heating casing after separating them, and can simply clean the inside of the outer casing in a state without the preheating casing and the heating casing.

Figure 3:
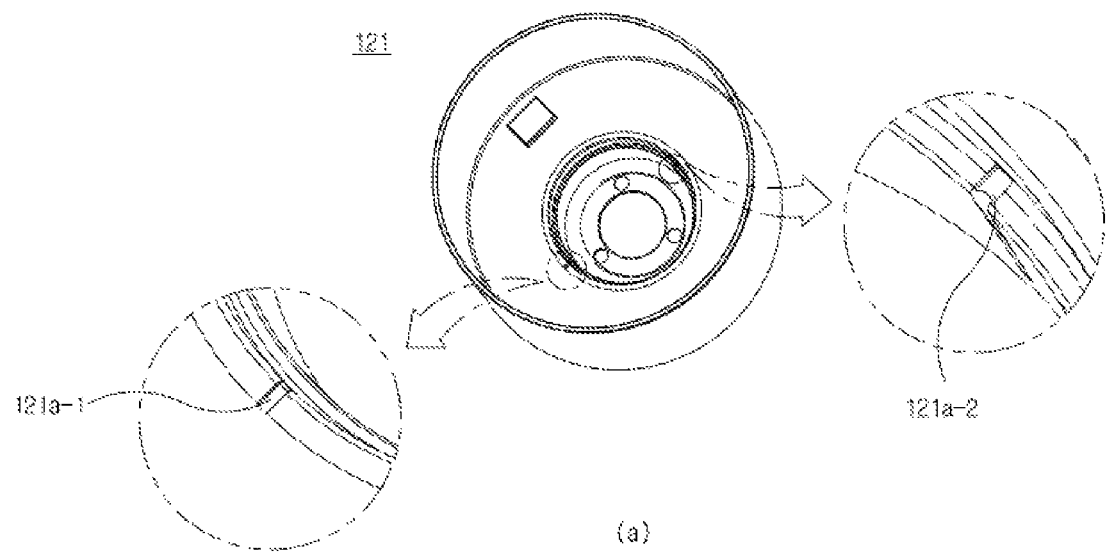
FIG. 3 is a view showing an outer casing according to the embodiment of the present disclosure.
Figure 3:
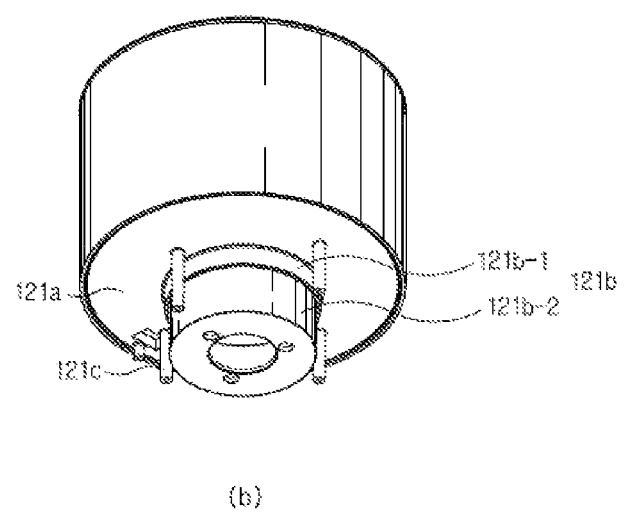

FIG. 3 is a view showing the outer casing according to the embodiment of the present disclosure. Hereinafter, the structure and shape of the outer casing according to the embodiment of the present disclosure will be described in detail with reference to FIG. 3.

The outer casing 121 has a hollow cylinder shape, and an upper end thereof is open and a lower surface is partially open at a center portion thereof. The rest of the lower surface of the outer casing 121 except for the open center portion is closed. The outer casing 121 may be preferably formed to be integrated with the main body into a single body, but the outer casing 121 may also be separated from the main body.

Except for the center portion of the lower surface of the outer casing 121, the rest of the lower surface thereof is closed, and an extended portion 121b extended to a predetermined length in a vertical direction (height direction of the outer casing) is formed at an end of the lower surface.

The extended portion 121b includes a first extended portion 121b-1 extended downward from a lower end of the lower surface of the outer casing to a predetermined length in the vertical direction and a second extended portion 121b-2 extended downward from the first extended portion 121b-1 to a predetermined length while being partially bent. The second extended portion 121b-2 has a diameter relatively smaller than a diameter of the first extended portion 121b-1.

The lower surface of the outer casing 121 has protrusions 121c inserted into holes formed on a lower main body so as to be coupled to the lower main body. The protrusions 121c formed on the lower surface of the outer casing 121 are inserted into the holes formed on the main body, so that the outer casing may maintain a fixed state to the main body.

Hereinafter, a bottom surface structure of the outer casing 121 will be described. The outer casing 121 has two gaps at a bottom surface therein. The gaps are formed at different distances from the center of the bottom surface in the outer casing. A first gap 121a-1 is formed on the first extended portion 121b-1 provided at a relatively long distance from the center of the bottom surface in the outer casing, and a second gap 121a-2 is formed on the second extended portion 121b-2 provided at a relatively short distance therefrom. A lower end of the preheating casing is in close contact with the first extended portion 121b-1 having the first gap 121d-1, and a lower end of the heating casing is in close contact with the second extended portion 121a-2 having the second gap 121a-2.

Figure 4A:
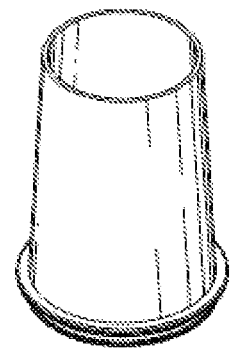
FIGS. 4A and 4B are views showing a preheating casing according to the embodiment of the present disclosure.
Figure 4B:
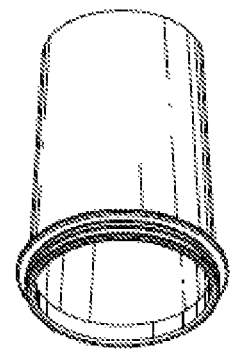

FIG. 4A and 4B are views showing a structure of the preheating casing according to the embodiment of the present disclosure. Hereinafter, the structure and shape of the preheating casing according to the embodiment of the present disclosure will be described in detail with reference to FIGS. 4A and 4B.

As shown in FIGS. 4A and 4B, the preheating casing 122 has a cylinder shape. In particular, the preheating casing 122 has a shape with open upper and lower surfaces.

The lower end of the preheating casing 122 is in close contact with the first extended portion formed on the lower surface of the outer casing 121 to prevent water stored in a space between the preheating casing 122 and the outer casing 121 from being introduced into the preheating casing 122. However, when the lower end of the preheating casing 122 is in close contact with the first extended portion formed on the outer casing 121, the water stored in the space between the preheating casing 122 and the outer casing 121 may be introduced into the preheating casing 122 through the first gap formed on the outer casing 121. Only through the first gap formed on the first extended portion, the water stored in the space between the preheating casing 122 and the outer casing 121 is introduced into the preheating casing 122.

Figure 5:
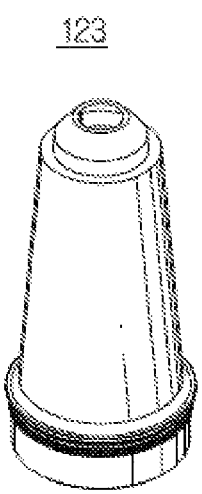
FIG. 5 is a view showing a heating casing according to the embodiment of the present disclosure.

FIG. 5 is a view showing a structure of the heating casing according to the embodiment of the present disclosure. Hereinafter, the structure and shape of the heating casing according to the embodiment of the present disclosure will be described in detail with reference to FIG. 5.

Referring to FIG. 5, like the shape of the preheating casing 122, the heating casing 123 has a cylinder shape, and an upper end and a lower surface thereof are open. In the present disclosure, steam generated in the heating casing 123 is sprayed outward by its own pressure.

In detail, when water heated by the heating means is changed into steam, a volume of the water is increased in the heating casing 123, and high pressure is generated due to the increased volume. The high pressure allows the steam to be sprayed to the outside of the humidifier.

The lower end of the heating casing 123 is in close contact with the second extended portion provided on the bottom surface of the outer casing 121 to prevent water stored in a space between the heating casing 123 and the preheating casing 122 from being introduced into the heating casing 123. However, in the state in which the lower end of the heating casing 123 is in close contact with the second extended portion provided on the outer casing 121, the water stored in the space between the heating casing 123 and the preheating casing 122 is introduced into the heating casing 123 through the second gap formed on the outer casing 121. In other words, the water stored in the space between the heating casing 123 and the preheating casing 122 is introduced into the heating casing 123 only through the second gap formed on the second extended portion.

The heating means 115 is provided at an upper end the lower main body, i.e. the lower surface of the heating casing 123, and the water introduced into the heating casing 123 is heated by the heating means and is changed into steam. Preferably, an amount of water introduced into the heating casing 123 through the second gap is supplied to the same level as an amount of steam sprayed by the heating means 115, so that the water in the heating casing 123 may be maintained at a predetermined level.

The second gap is formed at a portion lower than the lower surface of the outer casing 121, i.e. a minimum water level of the heating casing 123. In other words, the second gap is formed at a position lower than the lower surface of the outer casing 121 located outside the preheating casing 122. In addition, a portion between the second gap and the spraying port is sealed to allow the steam generated in the heating casing 123 to be sprayed through the spraying port. A lower end portion of the heating casing may have a shape protruding outward at a predetermined length.

The present disclosure does not propose a water container having a single structure, but a water container having at least a double structure consisting of the outer casing, the preheating casing, and the heating casing, as described above. As the present disclosure proposes the water container having at least double structure, the heating means 115 may reduce the time required to spray steam by heating only a portion of water stored in the heating casing instead of the whole water stored in the main body.

The water stored in the space between the preheating casing and the heating casing has been heated by being transmitted with a portion of heat from the water stored in the heating casing. Therefore, when the water is introduced into the heating casing, the time required to heat the water introduced into the heating casing and spraying steam changed from the water may be reduced.

In addition, the temperature of the water stored in the space between the outer casing and the preheating casing is lowered than the temperature of the water stored in the space between the preheating casing and the heating casing. Therefore, even when the user touches an outer portion of the outer casing, the user would not be burned.

In particular, the present disclosure has the water container consisting of a plurality of structures, so noise generated when the water in the heating casing is heated may be prevented.

Furthermore, the present disclosure may be preferably configured to arrange the first gap and the second gap not on the same radial circumference. Therefore, the outer casing has the first gap and the second gap formed on different locations thereof, and the first gap and the second gap are preferably located at opposite sides to each other.

Figure 6:
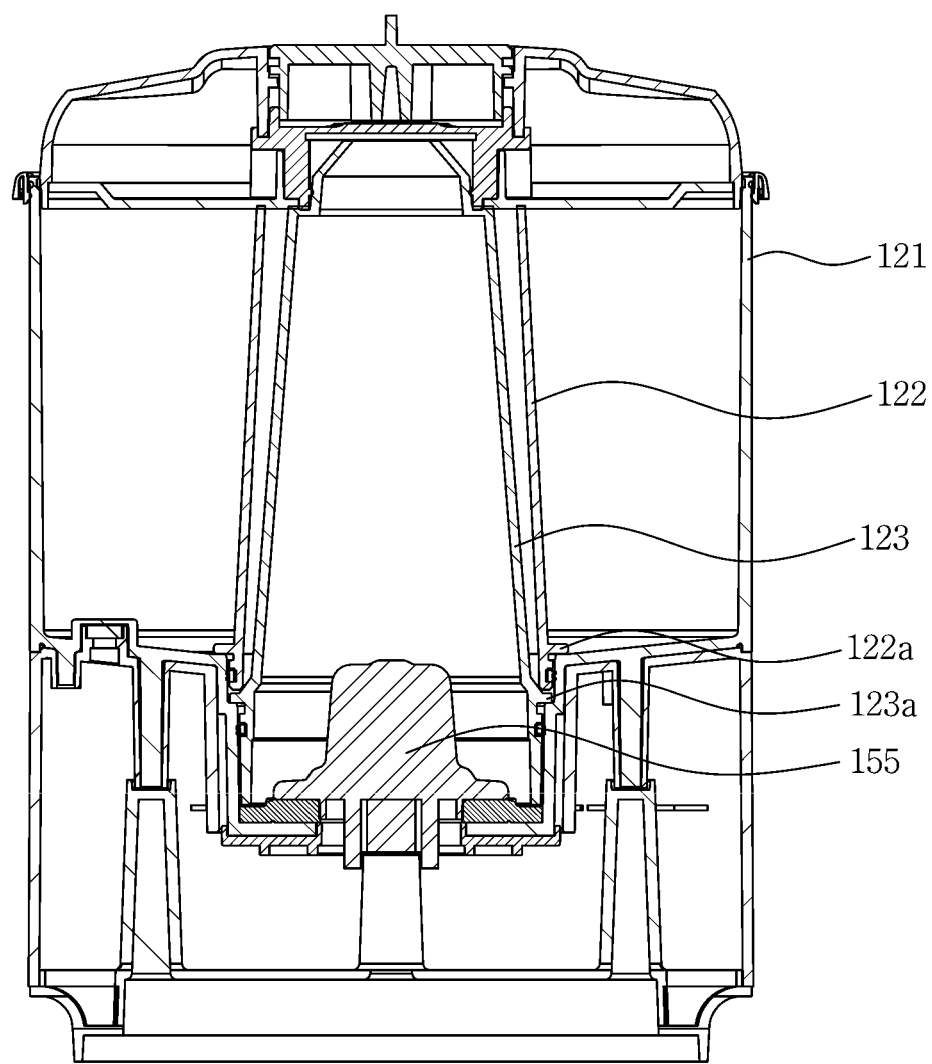
FIG. 6 is a sectional view showing a main body according to the embodiment of the present disclosure.

FIG. 6 is a view showing a sectional structure of the main body according to the embodiment of the present disclosure. Hereinafter, the sectional structure of the main body according to the embodiment of the present disclosure will be described in detail with reference to FIG. 6. In particular, FIG. 6 will be described with a focus on the structures of the outer casing, the preheating casing, and the heating casing.

As described above, the outer casing 121 is formed in a cylinder, and the lower surface thereof is closed except for the open center portion of the lower surface. Hereinbelow, a lower structure of the outer casing 121 will be described in detail. The lower surface of the outer casing includes a bottom portion 121a, the first extended portion 121b-1, and the second extended portion 121b-2. The bottom portion 121a is a remaining portion of the outer casing except for the open center portion thereof, and the first extended portion 121b-1 is provided by being vertically extended downward from the bottom portion 121a to the predetermined length and the second extended portion 121b-2 is provided by being bent from the first extended portion 121b-1 and extended downward to the predetermined length. As described above, the lower surface of the outer casing proposed by the present disclosure includes the bottom portion 121a, the first extended portion 121b-1, and the second extended portion 121b-2. The diameter of the second extended portion 121b-2 is smaller than the diameter of the first extended portion 121b-1.

The preheating casing 122 is formed in a cylinder with an open lower surface. The lower end of the preheating casing 122 is inserted in close contact with the first extended portion 121b-1 of the outer casing 121. In detail, the lower end of the preheating casing 122 has a protrusion 122a extended outward to a predetermined length, and the protrusion 122a is inserted into the lower end of the outer casing 121 while being in close contact with an upper end of the first extended portion 121b-1.

As described above, the heating casing 123 has a cylinder shape with an open lower surface. In addition, the lower end of the heating casing 123 has a protrusion 123a extended outward to a predetermined length, and the protrusion 123a is inserted into the lower end of the outer casing 121 while being in close contact with an upper end of the second extended portion 121b-2. In detail, in the present disclosure, while the heating casing 123 is inserted in the outer casing 121, the preheating casing 122 is inserted into a space between the outer casing 121 and the heating casing 123.

The present disclosure is configured to move water from an upper main body through the gaps, but the present disclosure is not limited thereto, and may be configured to move the water from the upper main body through a groove or other methods.

The present disclosure describes the humidifier, but is not limited thereto. Various devices using steam may use the outer casing, the preheating casing, and the heating casing proposed by the present disclosure to generate steam and use the generated steam. In this case, variously shaped discharge means discharging steam are provided in the device using steam. As an example, the present disclosure may be applied to various devices such as a steam cleaner, steamer, steam sterilizer, etc.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present disclosure relates to the easy-to-clean heated humidifier and, more particularly, to the easy-to-clean heated humidifier having the water container that may be easily separated and cleaned.

The easy-to-clean heated humidifier of the present disclosure in which the water container is divided into the outer casing, the preheating casing, and the heating casing may heat only water stored in the heating casing located at the innermost location in the water container by using the heating means, so that the time required for an initial spray of steam. In addition, water in the preheating casing is preheated by water in the heating casing and the preheated water is moved into the heating casing, so that the time required to vaporize the water in the heating casing into steam may be reduced.

The invention claimed is:

1. An easy-to-clean heated humidifier comprising:
a main body comprising:
an outer casing with a sidewall and an internally extended lower surface,
an inner casing that is located inside the outer casing and is detachably installed on the lower surface to form a space to store water between the inner casing and the sidewall of the outer casing, wherein the lower surface comprises at least one gap thereon to allow the water stored in the space between the inner casing and the sidewall of the outer casing to move into the inner casing, and
a heater configured to vaporize the water within the inner casing into steam; and
a cover provided at an upper end of the main body and comprising a spraying port configured to spray the vaporized steam to an outside of the humidifier,
wherein the inner casing comprises:
a preheating casing located inside the outer casing and detachably installed on the lower surface, and configured such that the water stored in a space between the outer casing and the preheating casing is moved into the inside of the preheating casing through a first gap and a second gap, both gaps being formed on the lower surface of the outer casing; and
a heating casing located inside the preheating casing and detachably installed on the lower surface, and configured such that the water stored in a space between the preheating casing and the heating casing moves into the inside of the heating casing through the first gap formed on the lower surface of the outer casing and the moved water is vaporized into steam by the heater,
wherein the first gap is formed on a first extended portion, and the second gap is formed on a second extended portion,
wherein in a state in which a lower outside surface of the preheating casing is in close contact with the first extended portion, the water stored in the space between the outer casing and the preheating casing is moved into the preheating casing through the first gap, and in a state in which a lower outside surface of the heating casing is in close contact with the second extended portion, the water stored in the space between the preheating casing and the heating casing is moved into the heating casing through the second gap.

2. The easy-to-clean heated humidifier of claim 1, wherein the heating casing is shaped in a cylinder.

3. The easy-to-clean heated humidifier of claim 1, wherein the first gap and the second gap formed on the outer casing are not located on a same radial circumference around a center of the outer casing.

4. The easy-to-clean heated humidifier of claim 3, wherein the second gap formed on the outer casing is located at a portion lower than a minimum water level of the water stored in the heating casing, and a portion between the second gap and the spraying port is sealed.

5. The easy-to-clean heated humidifier of claim 1, wherein the lower surface of the outer casing comprises:
a bottom portion extended from a lower end of a side surface of the outer casing to a predetermined length in a direction perpendicular thereto;
the first extended portion extended downward from the bottom portion to a predetermined length in a direction perpendicular thereto; and the second extended portion having a diameter relatively smaller than a diameter of the first extended portion, and being extended downward from the first extended portion to a predetermined length,
wherein a center portion of the lower surface of the outer casing is open.

\* \* \* \* \*